United States Patent
Melillo

(10) Patent No.: US 8,635,595 B2
(45) Date of Patent: Jan. 21, 2014

(54) METHOD AND SYSTEM FOR MANAGING NON-COMPLIANT OBJECTS

(75) Inventor: Marco Melillo, Termoli (IT)

(73) Assignee: International Business Machines Corporation, Armonk, NY (US)

( * ) Notice: Subject to any disclaimer, the term of this patent is extended or adjusted under 35 U.S.C. 154(b) by 2346 days.

(21) Appl. No.: 10/465,201

(22) Filed: Jun. 19, 2003

(65) Prior Publication Data

US 2004/0003122 A1 Jan. 1, 2004

(30) Foreign Application Priority Data

Jun. 20, 2002 (EP) ................................. 02368059

(51) Int. Cl.
  *G06F 9/44* (2006.01)
(52) U.S. Cl.
  USPC ........................................................ 717/120
(58) Field of Classification Search
  USPC ................. 714/101–103, 106–108, 120–123; 717/101–103, 106–108, 120–123
  See application file for complete search history.

(56) References Cited

U.S. PATENT DOCUMENTS

2004/0073782 A1* 4/2004 Price et al. ..................... 713/1

FOREIGN PATENT DOCUMENTS

WO  WO 00/77632 A1 * 12/2000

OTHER PUBLICATIONS

Sun Microsystems, "Getting Started with the Java Dynamic Management Kit 4.1", Sun Microsystems, Inc., pp. 1-52, Apr. 2000.*
SUN Microsystems, Inc., "Java Management Extensions", Jun. 1999, Priority Document serial No. 99/07583 for PCT WO 00/77632, France, pp. 1-115.*

* cited by examiner

*Primary Examiner* — Ted T Vo
(74) *Attorney, Agent, or Firm* — Jeffrey T. Holman

(57) ABSTRACT

A method and a corresponding system for managing non-MBeans (250) in the JMX architecture (215) are proposed. In the method of the invention, each non-MBean is supplied to a converter (255) that generates program code for defining a standard MBean (260m) implementing an interface (260i) named after itself. The interface exposes getter/setter methods, which are designed to return/assign corresponding public fields of the non-MBean. Moreover, the interface exposes methods for managing notifications (wrapping corresponding public methods of the non-MBean). Remaining public methods of the non-MBean are associated with corresponding operations of the MBean; support is also provided for relationships between non-MBeans. In this way, the MBean wraps the non-MBean making possible its management in the JMX architecture.

13 Claims, 6 Drawing Sheets

METHOD AND SYSTEM FOR MANAGING NON-COMPLIANT OBJECTS

FIELD OF THE INVENTION

The present invention relates to the data processing field, and more specifically to a method and a corresponding system for managing non-compliant objects.

BACKGROUND OF THE INVENTION

Management of objects representing different types of resources (such as software applications or hardware devices) is a critical issue in a data processing system, especially a computer network. This problem is particular acute for resources that have a high level of complexity or are distributed across a large number of installations.

Several technologies have been proposed in recent years for implementing a resource management framework. For example, environments for managing Java-based applications have become more and more popular with the widespread growth of the Internet (such as in e-commerce infrastructures). A standard architecture for managing resources in Java-based systems is the one conforming to the Java Management Extension (JMX) specification.

In the JMX architecture, each resource is represented by one or more MBeans. An MBean is a particular Java object, which complies with pre-set rules and principles. An MBean exposes a management interface to an MBean server, which interface defines a series of functions for accessing the associated resource. In this way, the MBeans are manageable through the MBean server that provides a standard way of performing management operations on the corresponding resources (irrespective of their implementation).

A non-MBean (a Java object that does not comply with the JMX specification) cannot be managed in the JMX architecture. This is a major problem, especially when some sort of coexistence between MBeans and non-MBeans is required. For example, whenever a resource represented by a non-MBean must be integrated into the JMX architecture, a completely new interface must be designed so as to comply with the constraints of the JMX specification. Therefore, the investment in terms of human resources spent on writing and testing the non-MBeans code is substantially lost, and a long period of time is required for attaining an acceptable level of reliability. This causes delays and high costs, and strongly limits the exploitation of the JMX architecture by structures with consolidated resource management frameworks. In any case, a good knowledge of the JMX specification is required to carry out the aforementioned conversion process.

A different approach is described in WO-A-0077632. This document proposes the use of a dynamic MBean, which is a particular type of MBean having an interface defined dynamically at run-time. For each non-MBean to be managed, an instance of the dynamic MBean is created passing the non-MBean as an argument. The dynamic MBean retrieves the characteristics conforming to the JMX specification that the non-MBean exposes. These characteristics define the interface of the non-MBean, which is returned to the MBean server. In this way, the dynamic MBean wraps the non-MBean simulating an MBean view thereof. The non-MBean may then be managed through the interface exposed to the MBean server by the dynamic MBean.

The solution described above (although quite flexible) suffers severe drawbacks. Particularly, the proposed method reduces the throughput of the resource management framework, in that each access to the non-MBean must go through time-consuming operations on the dynamic MBean.

Moreover, this structure requires the complete code of the dynamic MBean to always be available at run-time; as a consequence, the complexity of the resource management framework is strongly increased.

The method disclosed in the cited document does not support relationships between the non-MBeans. In fact, in the JMX architecture any relationship must go through the MBean server; therefore, non-MBeans calling methods on different objects directly cannot be managed using the solution described above. This drawback prevents the use of notifications among the non-MBeans.

SUMMARY OF THE INVENTION

The present invention deals with the problems noted above and can be characterized as a method including the steps of: analyzing a non-compliant object to identify exposed characteristics thereof, generating program code for creating a compliant object taking a reference to the non-compliant object, and generating program code for implementing exposed characteristics of the compliant object exploiting corresponding exposed characteristics of the non-compliant object, thereby making the non-compliant object manageable in the resource management framework through the compliant object.

Moreover, the present invention also provides a computer program for performing the method and a product storing the program. The invention also encompasses an object-oriented infrastructure for implementing the method and a corresponding system.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1:
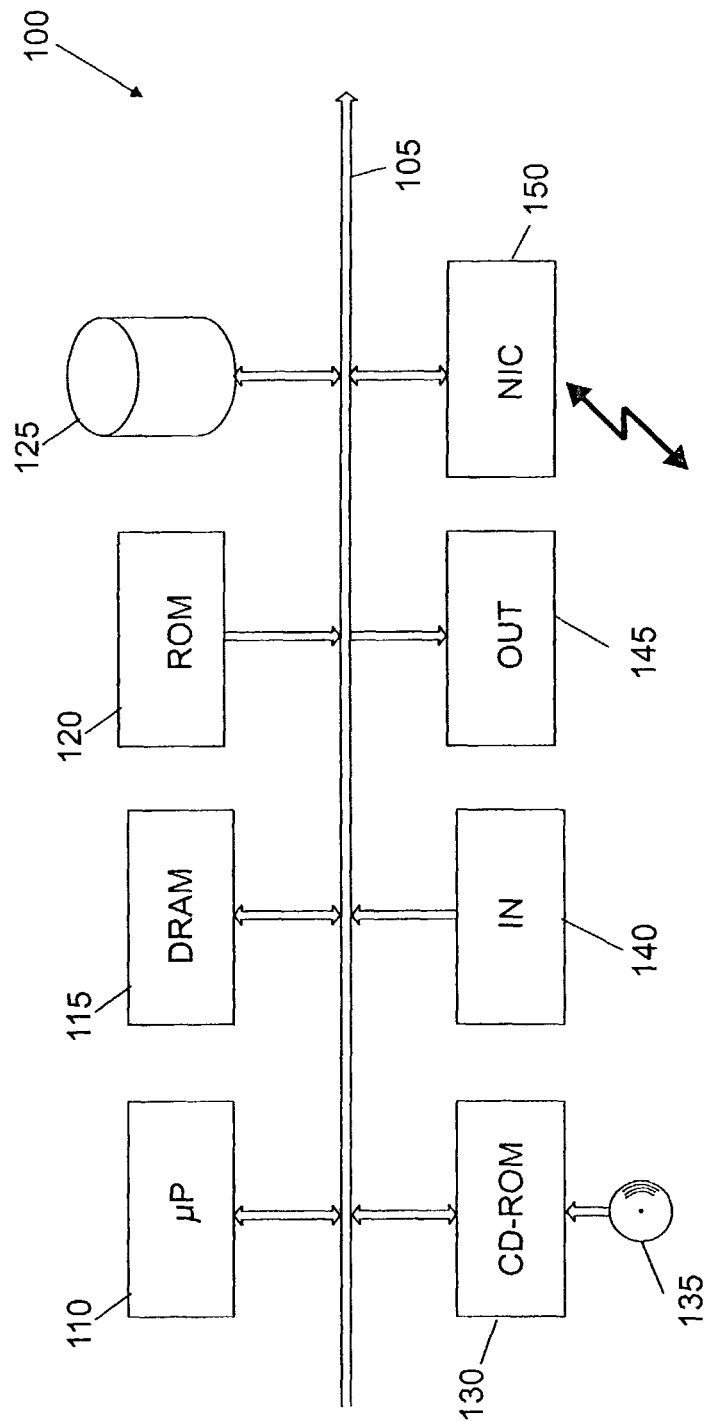
FIG. 1 is a schematic block diagram of a computer in which the method of the invention can be used.

With reference in particular to FIG. 1, a data processing system 100 (such as a personal computer) is shown. The computer 100 is formed by several units, which are connected in parallel to a communication bus 105. In detail, a microprocessor (mP) 110 controls operation of the computer 100, a DRAM 115 is directly used as a working memory by the microprocessor 110, and a Read Only Memory (ROM) 120 stores basic code for a bootstrap of the computer 100. Several peripheral units are further connected to the bus 105 (by means of respective interfaces). Particularly, a mass memory consists of a magnetic hard-disk 125 and a driver 130 for reading CD-ROMs 135. Moreover, the computer 100 includes input devices 140 (for example, a keyboard and a mouse), and output devices 145 (for example, a monitor and a printer). A network Interface Card (NIC) 150 is used to connect the computer 100 to a network, typically the Internet.

Similar considerations apply if the computer has a different structure (for example, with a multiprocessor architecture), if the computer includes other units (such as a scanner), if the computer is replaced with an equivalent data processing system (for example, consisting of a network of computers), and the like.

The computer described above implements a framework for managing several kinds of resources, such as stand-alone programs, client-server applications, Internet-based services, hardware devices, and the like. In a management framework, each resource is instrumented to enable access to corresponding information relating to the resource (such as data, events and status). This information is provided to an agent. The agent gets the information from the resources and communicates with one or more management applications. Each management application presents data, events and status about the resources to users of the management framework. Preferably, the management framework conforms to the Java Management Extension (JMX) specification, which defines a standard architecture for managing resources in Java.

Java is an object-oriented language well suited to Internet applications. Object-oriented programming is a method of software-development that is organized around reusable entities. More specifically, an object-oriented application involves the manipulation of objects; each object embeds the definition of both data (called fields) and functions (called methods) that can be applied to the data. A generic entity in an object-oriented environment may be either private (when its access is restricted) or public (when it is exposed to other entities). For example, a private attribute can only be used by the methods of the owning object, whereas a public attribute may be read and/or written from the outside; a private method is likewise only accessible inside the owning object, whereas a public method may be called from the outside.

Any object is an instance of a class; the class is a template definition of the fields and methods in a particular type of objects. A new object is created calling a specific method (referred to as constructor); the constructor takes an argument identifying the name of the class to be instantiated.

Classes are organized in a hierarchical structure. Java does not support multiple dependencies; therefore, a class may only extend a single parent class (called superclass) thus inheriting its characteristics. A class may be either abstract (when it can only be inherited but not instantiated) or concrete (when it may be instantiated and/or inherited). A method in a class may also be abstract, when it only includes the declaration of its signature (specifying the type of the arguments and results); in this case, the abstract method is concretely defined by any object instantiating the owning class. Moreover, a class may also implement one or more interfaces; an interface consists of a template definition basically containing the declaration of abstract methods (which are typically defined by any class implementing the interface).

Java supports a reflection process, which allows information about an object to be discovered at runtime. For this purpose, an immutable object of the type "java.lang.Class" is maintained for each class; this object represents the class, and has a series of methods that can be called for retrieving its characteristics.

For example, the method "getname" returns a string qualifying the name of the class instantiated by an object, and the method "getInterfaces" returns an array representing the interfaces implemented by the class.

Moreover, the method "getDeclaredConstructors" returns an array of objects listing all the constructors declared by the class; the method "getconstructors" likewise returns an array of objects listing all the constructors of the class (declared either by the class itself or by any superclass). The method "getConstructor" or the method "getDeclaredConstructor", respectively, are then used for returning an object describing a specified constructor.

In a similar manner, the method "getDeclaredFields" returns a list of all the public fields declared by the class and the method "getFields" returns a list of all the public fields of the class. The method "getField" or "getDeclaredField", respectively, are then used for returning an object describing a specified field (such as its name and type). The methods "getDeclaredMethods" and "getMethods" likewise return a list of the public methods of the class; the methods "getMethod" and "getDeclaredMethod" are used for returning an object describing a specified method (such as its name, arguments, results, signature, and exceptions).

Java applications (mainly consisting of the definitions of classes, interfaces and objects) are written in source code files (ending with a .java extension). The source code is compiled into a format called bytecode (ending with a .class extension). The bytecode is executed by a Java interpreter. Alternatively, the bytecode is converted directly into machine language instructions by a just-in-time compiler.

A particular software component model for Java is defined in the JavaBeans specification, described in "Mastering Java-Beans", Lawrence Vanhelsuwé, SYBEX (ISBN 0-7821-2097-0). JavaBeans (in short Beans) are reusable software components that can be manipulated visually in a builder tool, such as the JavaBeans Development Kit (JDK). The Beans comply with a pre-set specification, consisting of a series of common rules and principles that define standard naming conventions and type signatures (referred to as design pattern). The most important features of the Bean specification are the support of attributes, events and introspection. A particular kind of Beans, called Managed Beans (or MBeans), is used for instrumenting resources in the JMX architecture, as described in "Jmx: Managing J2ee Applications with Java Management Extensions" by Marc Fleury, Juha Lindfors, The JBoss Group; for this purpose, the MBeans apply further constraints to the design pattern (as described in the following).

In detail, attributes are entities (such as fields or computed vales), which are always accessed via methods (called accessor methods) relying on standard naming conventions. MBeans only support single-value attributes (and not indexed ones); the attributes of an MBean define discrete, named characteristics of the MBean specifying its appearance, its behavior, or a feature of the instrumented resource.

In detail, any attribute of the type "AttributeType" and whose name is "AttributeName" is read by a getter method matching the pattern:

public AttributeType getAttributeName( )
(specifying that the method is public, returns an object of the type "AttributeType", is called "getAttributeName", and does not require any argument). The same attribute is written using a setter method:

public void setAttributeName(AttributeType value)
(specifying that the method is public, does not return any result, is called "setAttributeName", and requires an argument of the type "AttributeType" that is assigned to a variable "value" for setting the attribute).

If both the getter method and the setter method are available, the attribute is read/write; conversely, if only the getter method or only the setter method is available the attribute is read-only or write-only, respectively. For example, a string attribute whose name is "Label" is set to the value "Test" calling the method:
   setLabel("Test")
the same string is then read (returning the value "Test") calling the method:
   getLabel( )
In addition, when the attribute "AttributeName" is of the Boolean type, the respective getter method is optionally allowed to match the pattern:
   public boolean isAttributeName( )
For example, a Boolean attribute whose name is "Active" is read calling the method:
   isActive( ).
All the other public methods of the MBean that do not belong to the getter/setter pair are called operations. Operations define actions that the instrumented resource makes available to the management applications. For example, the operation "reset( )" is used to initialize the instrumented resource.

Referring now to the event support of Beans in general, this feature provides a mechanism for allowing some Beans to act as sources of events (or broadcaster), which can be caught and processed by other Beans acting as targets of the events (or listeners).

An event is propagated using an object that encapsulates all the information associated with the corresponding state change and that needs to be conveyed to the listeners (such as an identifier of the event type, a serial number specifying a particular instance of the event, a time stamp, and an associated message). An event object instantiates a class that extends the java.util.EventObject class and is given a name ending in "Event" by convention.

Events are handled calling corresponding methods on the listeners; each handling method has a single argument consisting of an event object. The handling methods are declared in interfaces, each one specifying one or more related handling methods for events of the same kind; every interface extends the java.util.EventListener class and is given a name ending with "Listener" by convention. Listeners identify themselves as interested in a particular kind of events by implementing the corresponding interface.

In order for a potential listener to receive the events of a specific type, the listener must be registered with the appropriate broadcaster that emits the events associated with the corresponding interface. For this purpose, each broadcaster provides two methods that conform to standard naming conventions. Particularly, any Bean broadcasting events associated with the interface "NameListener" includes a method for registering listeners implementing this interface, which method matches the pattern:
   public void addNameListener(NameListener listener)
The same listeners are likewise de-registered invoking a method:
   public void removeNameListener(NameListener listener).

The JMX specification enables MBeans acting as listeners to register only once and still receive all different events (called notifications) that may occur. A notification object instantiates a class extending the java.util.EventObject class and whose name is "Notification".

Each listener must implement an interface called "NotificationListener"; the interface "NotificationListener" declares a single handling method whose name is "handleNotification" and that is called when a broadcaster emits a notification. The method "handleNotification" takes two arguments and does not return any result:
   public void handleNotification
   (Notification notification, java.lang.Object handback).
The first argument is the notification object used to convey all the information associated with the notification to the listener. The second argument consists of a generic object, which is provided by the listener upon registration, is stored on the broadcaster, and is handed back to the listener with each notification; the hand-back object is then opaque to the broadcaster emitting the notification, and is used by the listener to retrieve some context information while processing the notification.

Moreover, each broadcaster must implement an interface called "NotificationBroadcaster"; the interface "NotificationBroadcaster" declares three methods whose names are "addNotificationListener", "removeNotificationListener" and "getNotificationInfo".

The method "addNotificationListener" takes three arguments and does not return any result:
   public void addNotificationListener
   (NotificationListener listener,
   NotificationFilter filter,
   java.lang.Object handback).
The first argument (of the "NotificationListener" type) specifies the listener to be registered. The second argument consists of a filter object implementing the interface "NotificationFilter", which declares a unique method whose name is "isNotificationEnabled". The broadcaster calls this method before emitting a notification to the corresponding listener; the method "handleNotification" on the listener is called only if the result of the method "isNotificationEnabled" is positive (so as to restrict the set of currently registered listeners to be notified). The third argument consists of the hand-back object to be returned to the listener with each notification.

The method "removeNotificationListener" takes a single argument and does not return any result:
   public void removeNotificationListener
   (NotificationListener listener)
The argument (of the "NotificationListener" type) consists of the listener to be de-registered.

The method "getNotificationInfo" takes no argument and returns a single result:
   public java.management.MBeanNotificationInfo[ ]
   getNotificationInfo( ).
The result of the method consists of an object of the type "MBeanNotificationInfo" (which extends the class "MBeanFeatureInfo"); this object contains the name of the class of the notification and the notification types sent.

For example, let us consider a broadcaster whose name is "MouseBroadcaster" (implementing the interface "NotificationBroadcaster") and a listener whose name is "WindowListener" (implementing the interface "NotificationListener"); the "MouseBroadcaster" emits notifications, which are triggered by different operations carried out with the mouse (such as a movement, a click, and the like). Assuming that the "WindowListener" is associated with a filter object "WindowFilter" and with a hand-back object "WindowHandBack", the "WindowListener" registers itself to the "MouseBroadcaster" by calling the method:
   AddNotificationListener
   (WindowListener WindowFilter WindowHandBack).
Whenever a change state for the mouse is detected (such as its movement) the "MouseBroadcaster" emits a corresponding notification by calling the method "handleNotification" on the "WindowListener" (and passing all the information related to the movement in a corresponding notification object whose name is "MouseNotification"):

WindowListener.handleNotification
(MouseNotification WindowHandBack).

Once the "WindowListener" is no longer interested in the notifications, it de-registers from the "MouseBroadcaster" by calling the method:

removeNotificationListener(WindowListener).

Finally, introspection is a process allowing an MBean to be analyzed so as to determine which attributes, methods and notifications the MBean supports. The introspection is carried out calling a method "getMBeanInfo", which returns an object of the type "MBeanInfo" listing the aforementioned information. Introspection may be either shallow (when only the characteristics of the class instantiated by the MBean are analyzed) or deep (when all the characteristics of the MBean are analyzed, including the ones inherited by any superclass).

Introspection exploits the set of naming conventions and type signatures defined in the design pattern of the JMX specification. In detail, pairs of matching methods:

public AttributeType getAttributeName( )
public void setAttributeName(AttributeType value)

are looked for (wherein the first method name starts with "get", the second method name starts with "set", and the first method returns an object of the same type as the argument of the second method).

Whenever such methods are discovered, they are regarded as defining a read-write attribute whose name is "AttributeName". If only the get method or the set method is found, the corresponding attribute is regarded as read-only or write-only, respectively. For example, the getter/setter pair:

public string getLabel( )
public void setLabel(string value)

is regarded as defining the read/write attribute "Label" of the string type.

In addition, for Boolean attributes, a getter method is allowed to match the pattern:

public boolean isAttributeName( )

For example, the getter method:

public boolean isActive( )

is regarded as defining a read-only attribute "Active" of the Boolean type.

Additional constraints are defined by the JMX specification. The main one is that each MBean must expose a specified management interface to an MBean server acting as an agent for the corresponding resource. The interface defines the public methods of the MBean that are available for managing the instrumented resource (with any other public method of the MBean not listed in the interface that is not accessible to the management applications).

An MBean that implements an interface whose name is formed by adding the "MBean" suffix to its class name is called standard (this constraint is also satisfied if one of the respective superclasses implements an interface named after itself); for example, a standard MBean instantiating the class "ClassName" implements the interface "ClassNameMBean". On the other hand, an MBean that implements a predefined interface "DynamicMBean" is called dynamic. In this way, the characteristics exposed by a standard MBean may be retrieved at compile time (from the respective interface); conversely, the characteristics exposed by a dynamic MBean are defined at runtime by the dynamic MBean itself in the object "MBeanInfo" that is returned by the method "getMBeanInfo( )".

Any MBean used in the management framework must be registered in the MBean server. The MBean is assigned an object name (of the type "ObjectName"), which uniquely identifies the MBean in the context of the MBean server. The object name consists of a domain name and an unordered set of one or more key properties. The domain name is an application-dependent string providing a structure for a naming space within the MBean server; the domain name may be omitted, as the MBean server is able to provide a default domain name.

Each key property consists of a property-value pair, which makes it possible to assign unique names to the MBeans of a given domain. Object names are usually built and displayed using their string representation, which has the following syntax:

[domainName]:property=value[,property=value].

For example, the object name for the K-th instance of the class "ClassName" is created (in the default domain name) with a property "type" having the vale "ClassNameK":

new ObjectName(":type=ClassNameK")

Typically, the MBean server also supports call-back methods that are called before and after registering or de-registering the MBean for controlling the corresponding process; in addition, these methods allow the MBeans to keep a reference to the MBean server with which they are registered.

In the JMX architecture, all operations on the MBeans must go through the MBean server. Particularly, any relationship between MBeans is managed by the MBean server (in other words, an MBean cannot call a method on another MBean directly). The relationship involves calling the method "invoke" on the MBean server. The method "invoke" takes four arguments and returns a single result:

public java.lang.Object invoke
(ObjectName name,
java.lang.String operationName,
java.lang.Object[ ] arguments,
java.lang.Object[ ] signature)

The first argument consists of the object name of the MBean on which the method must be called; the second argument is the name of the method to be called. The third argument consists of an array with the values to be passed to the method; the fourth argument is a further array specifying the type signature of the method. The method "invoke" returns a generic object consisting of the result of the called method.

As far as notifications are concerned, this means that each listener registers or de-registers itself to a broadcaster by invoking the method "addNotificationListener" or the method "removeNotificationListener", respectively, on the broadcaster through the MBean server; the broadcaster likewise emits a notification invoking the method "handleNotification" on each listener through the MBean server.

Moreover, the MBean server provides a series of functions for accessing the registered MBeans; for example, the MBean server implements queries for retrieving a specific MBean (by its object name) or a collection of MBeans (by means of a pattern matching on their object names); the MBean server also supports introspection of the MBeans in order to discover their management interface. In this way, any management application retrieves information about the registered MBeans and then asks the MBean server to read and/or write attributes or execute operations on the MBeans; the MBean server in turn calls methods on the MBeans and returns results (if any).

Figure 2:
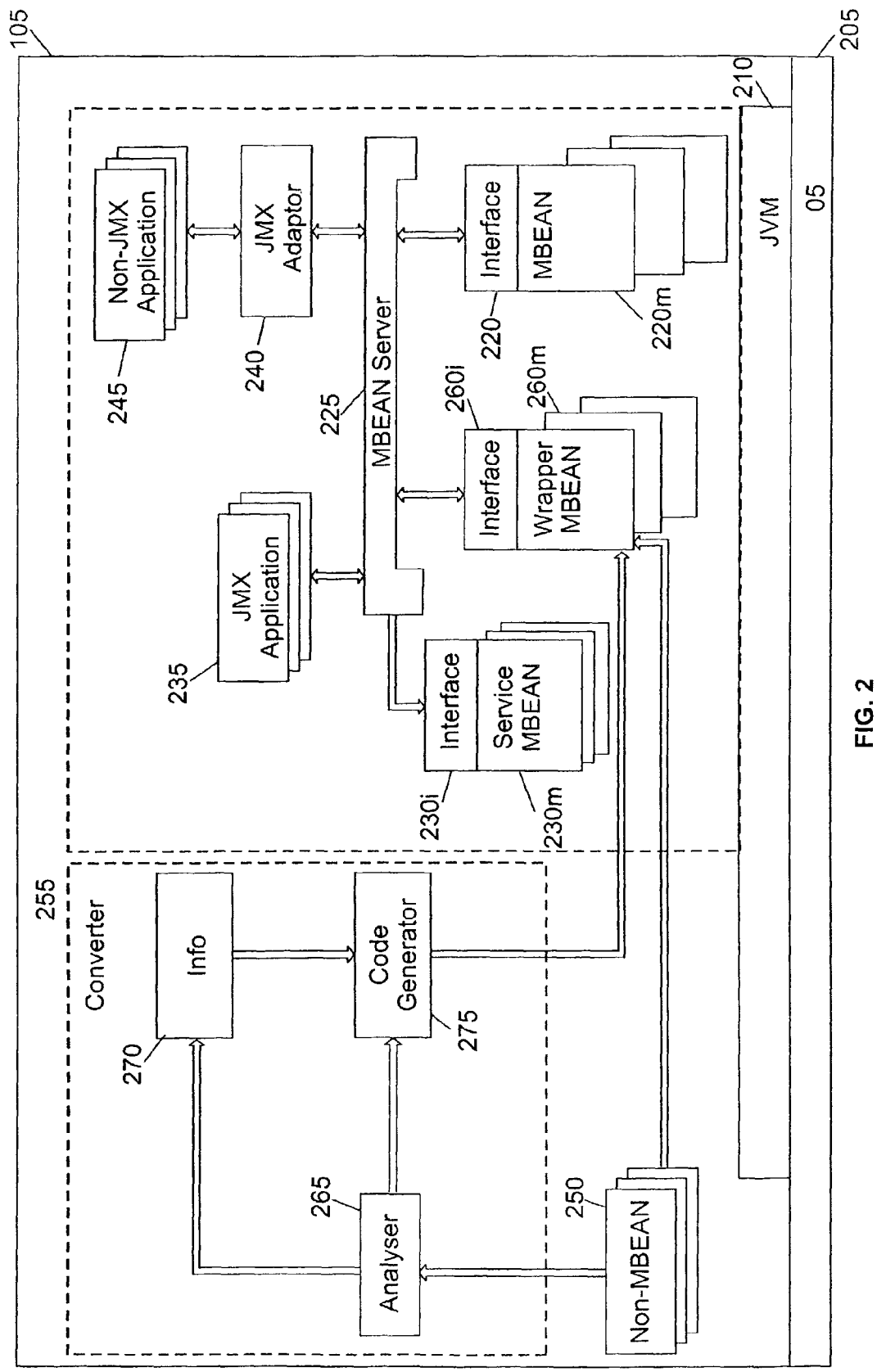
FIG. 2 shows a partial content of a working memory of the computer.
Figure 3A:
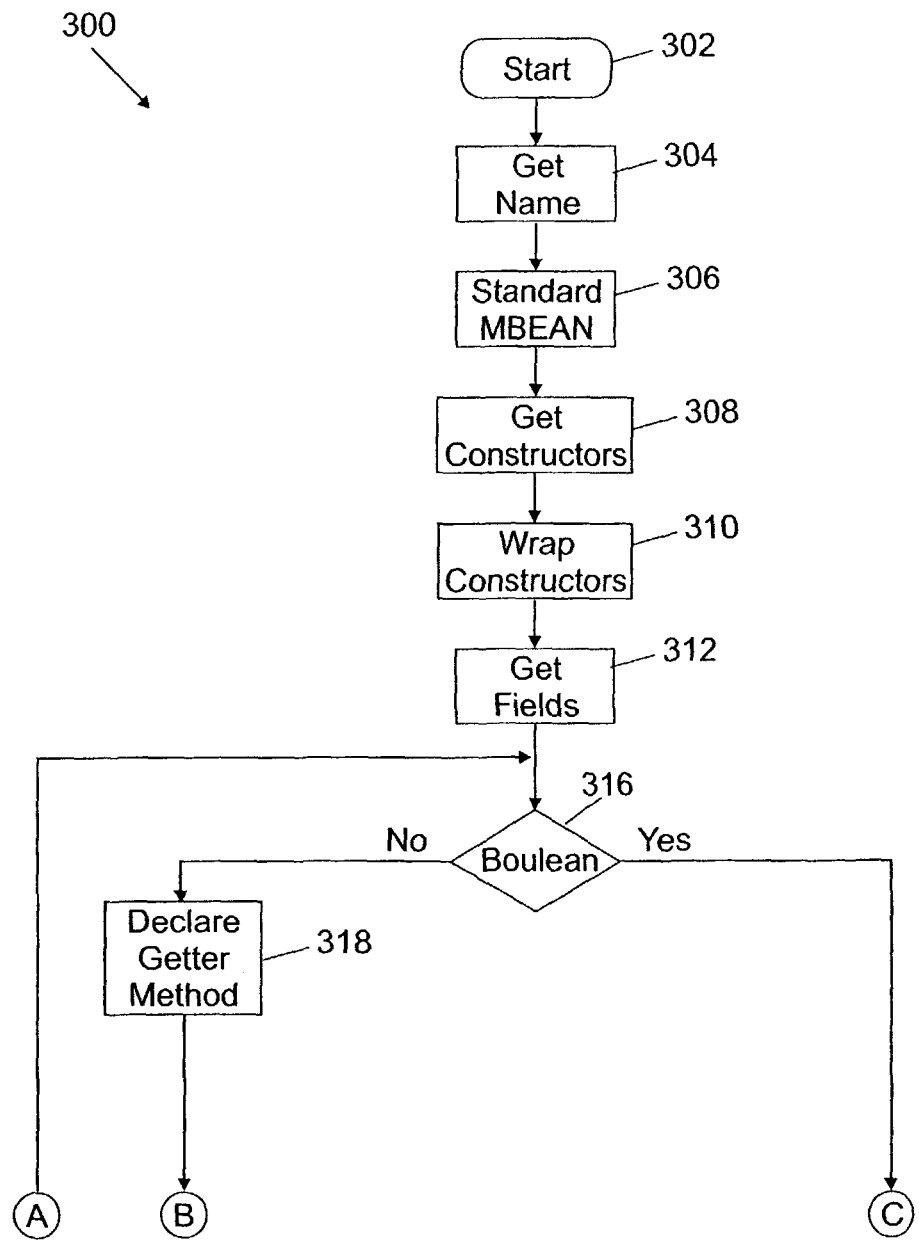
FIG. 3, consisting of FIGS. 3a-3d, is a flow chart describing the operation of a converter implementing the method of the invention.
Figure 3B:
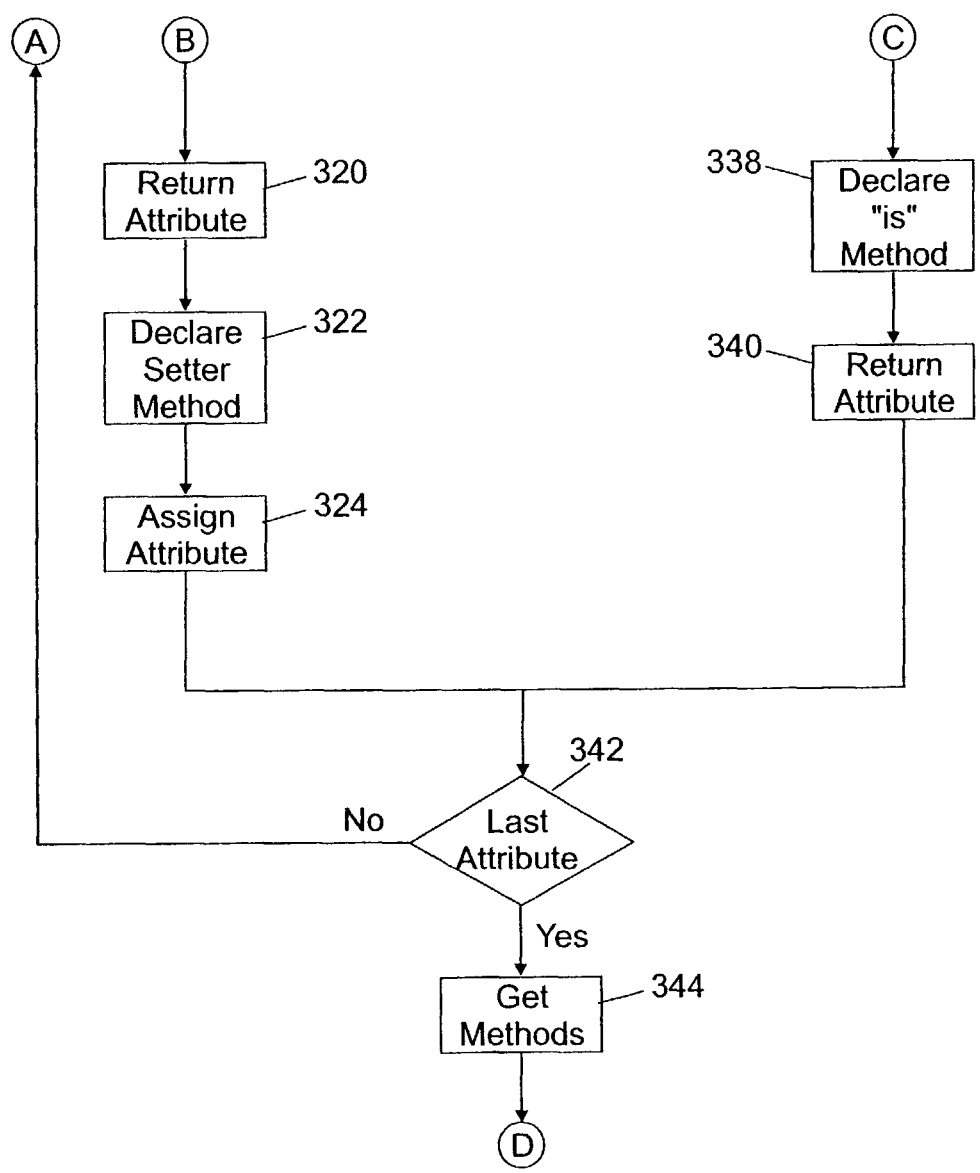
Figure 3C:
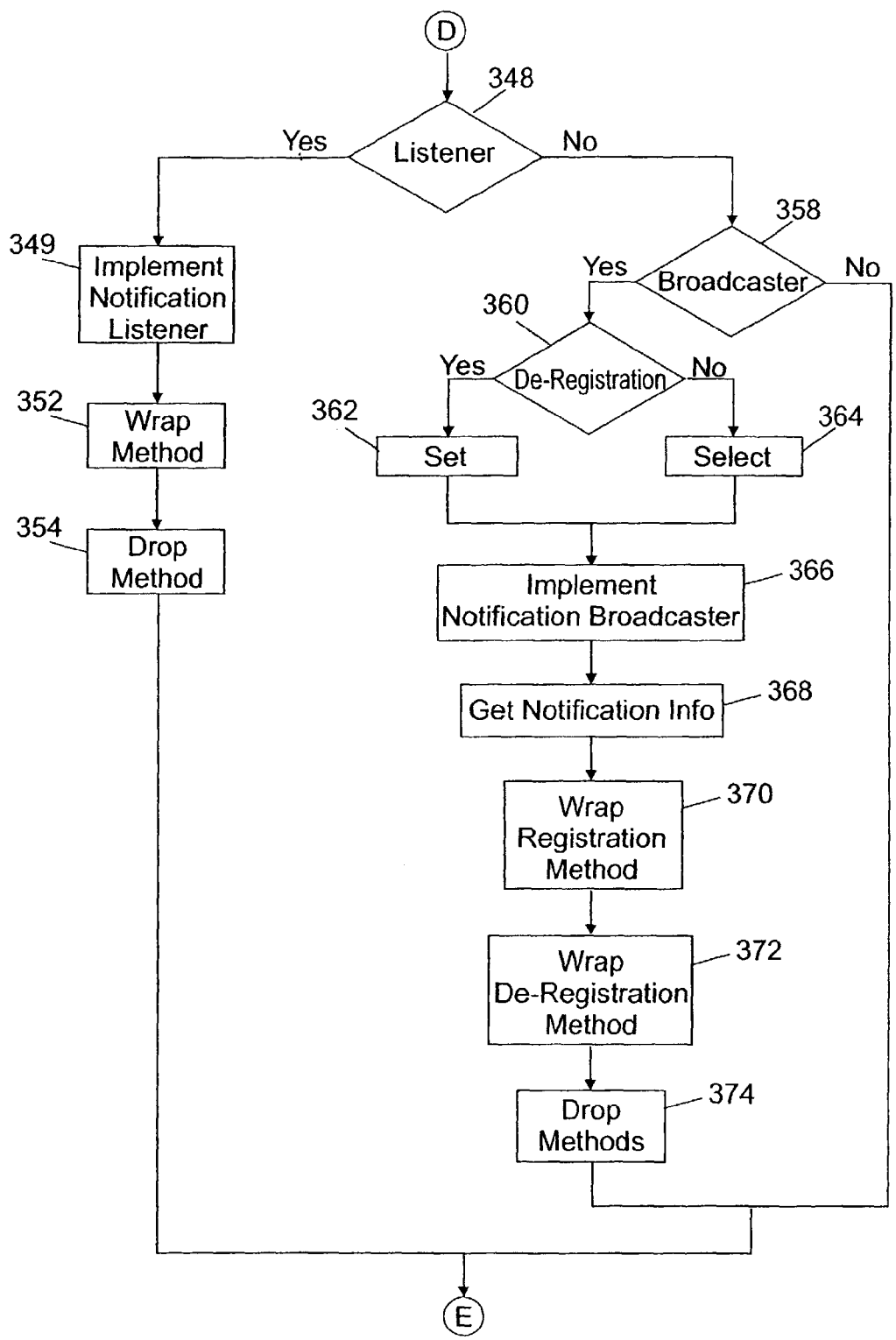
Figure 3D:
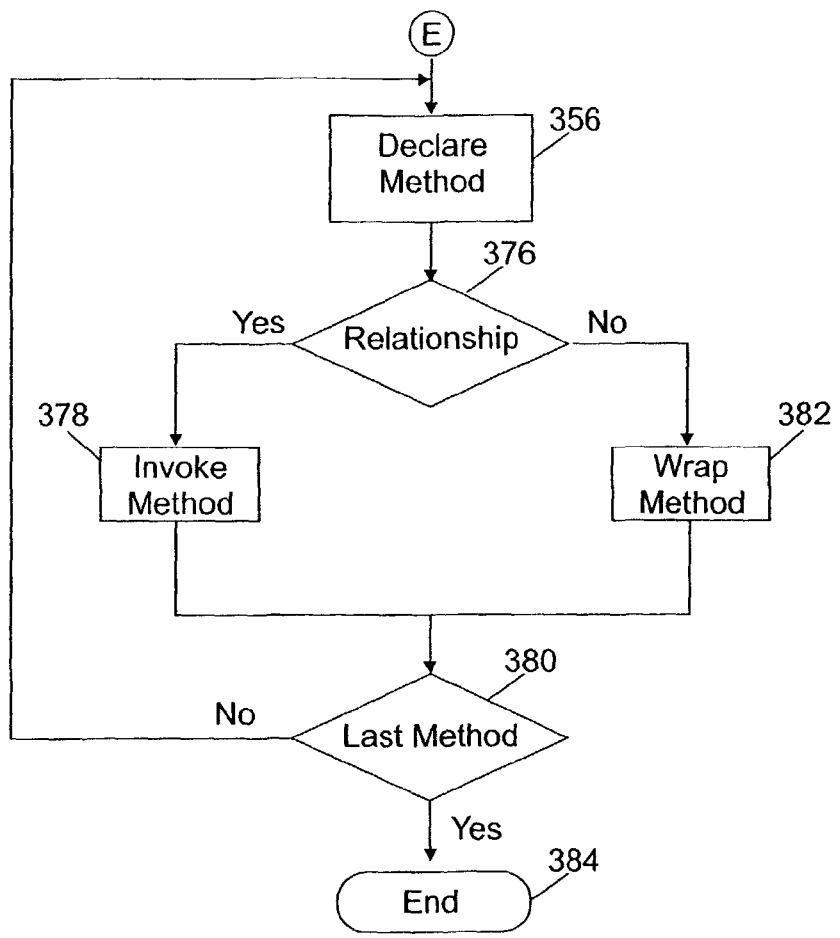

Considering now FIG. 2, a part of the content of the working memory 115 of the computer in operation is shown; the information (programs and data) is typically stored on the hard-disk and loaded (at least partially) into the working memory when the programs are running. The programs are typically initially installed onto the hard disk from CD-ROM.

An operating system (OS) 205 provides a software platform for the computer, on top of which other programs can run. A Java Virtual Machine (JVM) 210 is installed over the operating system 205. The JVM 210 is an abstract computing machine providing a runtime environment for applications written in the Java language, which environment is independent of the underlying (hardware and software) platform of the computer.

The computer implements a JMX management framework 215. Multiple MBeans 220m define an instrumentation level of the JMX management framework 215. Each MBean 220m exposes a management interface 220i to an MBean server 225. The MBean server 225 provides a series of services (such as a monitor, a timer, and the like), each one implemented by a corresponding MBean 230m with a respective interface 230i. The MBean server 225 (together with the service MBeans 230m) defines an agent level of the JMX management framework 215. The MBean server 225 communicates with one or more JMX-compliant management applications 235. A JMX adaptor 240 enables management applications 245 that do not comply with the JMX specification to access the MBean server 225.

One or more non-MBeans 250 provide instrumentation for resources that are not supported by the JMX management framework 215. As described in detail in the following, a converter 255 accesses the non-MBeans 250 and generates corresponding standard MBeans 260m, each one wrapping a respective non-MBean 250; the MBean 260m exposes an interface 260i, which allows management of the non-MBean 250 (by the MBean server 225) through the MBean 260m. Particularly, the converter 255 includes an analyzer 265 that identifies the characteristics exposed by the non-MBeans 250. For this purpose, the analyzer 265 exploits the reflection process supported by Java; moreover, the analyzer 265 accesses and parses the source code defining the classes instantiated by the non-MBeans 250. The retrieved information about the non-MBeans 250 is stored in a data structure 270 (for example, consisting of a series of tables). The analyzer 265 further communicates with a code generator 275, which accesses the data structure 270 as well. The code generator 275 outputs the source code defining the MBeans 260m with their interfaces 260i.

Similar considerations apply if different features of the JMX specification are supported, such as bound attributes (providing a service for notifying their changes) or constrained attributes (allowing other MBeans to validate the changes and reject them if inappropriate), if the object name is created using one or more different key properties of the MBean, and the like. Moreover, different rules may be defined for allowing the names of a reading method and/or of a writing method associated with each attribute to be defined uniquely, and vice-versa for allowing the name of an attribute associated with each reading method and/or writing method to be defined uniquely. Alternatively, the programs and data are structured in a different manner, the resource management framework has another architecture, or different techniques are envisaged for analyzing the non-MBeans.

With reference now to FIGS. 3a-3d, whenever a non-MBean must be managed, the converter is called passing the non-MBean as argument. In response thereto, the converter performs a method 300; the method starts at block 302 and then passes to block 304, wherein the converter gets the name of the class instantiated by the non-MBean (using the method "getName"). Proceeding to block 306, the converter creates a new class and a corresponding interface that define a standard MBean for wrapping the non-MBean; the MBean class has a private field referring to the non-MBean. For example, if the non-MBean instantiates the class "MyClass":
    public class MyClass{ }
the converter creates the interface "MyClassWMBean" and the class "MyClassW" that implements this interface and has a private field "MyObject" of the type "MyClass":
    public interface MyClassWMBean{ }
    public class MyClassW
       [implements MyClassWMBean]
       {private MyClass MyObject}.

The method then passes to block 308, wherein the converter gets all the constructors of the non-MBean class declared by either the non-MBean class itself or any respective superclass (using the method "getConstructors"). Continuing to block 310, for each retrieved constructor of the non-MBean class a new constructor that wraps the retrieved constructor is added to the MBean class; the constructor throws the same exceptions and receives the same arguments (if any) as the retrieved constructor. For example, if the non-MBean class has a constructor that receives the arguments "MyArguments", implements the interfaces "MyInterfaces" and throws the exceptions "MyExceptions":
    public MyClass(MyArguments)
    [implements MyInterfaces]
    throws MyExceptions
the converter adds the following constructor to the class "MyClassW":
    public MyClassW(MyArguments)
    Throws MyExceptions
    {MyObject=new MyClass(MyArguments)}.

Moving to block 312, the converter gets all the public fields of the non-MBean class declared by either the non-MBean class itself or any respective superclass (using the method "getFields"). For each retrieved field (which is considered an attribute of the MBean), a loop is then performed starting at decision block 316 wherein the type of a current attribute (from the first one) is checked. If the attribute is not of the Boolean type the blocks 318-324 are executed, whereas if the attribute is of the Boolean type the blocks 338-340 are executed; in both cases, the method then descends into block 342.

Considering block 318 (non-Boolean attribute), a getter method for the attribute is declared in the MBean interface. The method then passes to block 320, wherein the getter method is defined and added to the MBean class so as to return the attribute of the non-MBean directly. For example, if the non-MBean class has an attribute "MyAttribute" of the type "MyType", the getter method "getMyAttribute" is defined in the interface "MyClassWMBean":
    public MyType getMyAttribute( ) { }
and the following method is added to the class "MyClassW":
    public MyType getMyAttribute( )
       {return MyObject.MyAttribute}.

A setter method for the attribute is likewise declared in the MBean interface at block 322. The method proceeds to block 324, wherein the setter method is defined and added to the MBean class so as to assign the attribute of the non-MBean directly. The method then descends into block 342. In the example at issue (attribute "MyAttribute" of the type "MyType"), the setter method "setMyAttribute" is defined in the interface "MyClassWMBean":
    public void setMyAttribute(MyType value) { }
and the following method is added to the class "MyClassW":
    public void setMyAttribute(MyType value)
    {MyObject.MyAttribute=value}.

Moving now to block 338 (Boolean attribute), a getter method for the attribute (in the "is" format) is declared in the MBean interface. The method continues to block 340, wherein the getter method is defined and added to the MBean class so as to return the attribute of the non-MBean class directly. The method then descends into block 342. For example, if the non-MBean class as an attribute "BooleanAttribute" of the Boolean type, the getter method "isBooleanAttribute" is defined in the interface "MyClassWMBean":
    public boolean isBooleanAttribute( ) { }
and the following method is added to the class "MyClassW":
    public boolean isBooleanAttribute( )
        {return MyObject.BooleanAttribute}.
The method verifies at block 342 whether the last attribute has been processed. If not, the method returns to block 316 for repeating the operations described above on a next attribute.

On the contrary, the method continues to block 344, wherein the converter gets all the public methods of the non-MBean class (using the method "getMethods"). A test is made at block 348 to verify whether the non-MBean class includes statements calling two methods on a different object and passing a single argument consisting of the non-MBean itself; at the same time, the converter verifies whether the non-MBean class has a single signaling method (with no arguments) that is called by the other object.

If both the conditions are satisfied, the non-MBean is considered a listener (with the other object that is a broadcaster), and a statement implementing the interface "NotificationListener" is added to the MBean class at block 349; in this way, the method "handleNotification" is declared for the MBean class.

Proceeding the block 352, the method "handleNotification" is defined and added to the MBean class so as to wrap the signaling method of the non-MBean class. The method "handleNotification" receives two arguments of the type "Notification" and "Object" and then calls the signaling method directly (without passing any argument). The method continues to block 354, wherein the signaling method is dropped in the list of the retrieved methods; the method then passes to block 356 (described in the following).

For example, if the non-MBean class has a method "myHandling" (with no arguments):
    public void myHandling( )
the method "handleNotification" (declared in the interface "NotificationListener") is added to the class "MyClassW" as follows:
    public void handleNotification
    (Notification notification java.lang.Object handback)
        {MyObject.myHandling( )}.

Referring back to block 348, if the non-Bean is not a listener the method continues to decision block 358. The converter verifies whether the non-MBean class includes a statement calling a method (with no arguments) on different objects; at the same time, the converter verifies whether the non-MBean has two methods that are called by each one of the other objects passing a single argument consisting of the other object itself. If at least one of the conditions is not satisfied, the method descends into block 356 directly. Conversely, if both the conditions are satisfied the non-MBean is considered a broadcaster (with the other objects that are listeners), and the method enters decision block 360.

A test is then made to determine whether one of the called methods has a name indicative of a de-registration operation; for example, the names of the called methods are compared with a pre-set list of words (such as "deregister", "de-register", "delete", "remove", "cancel"), in order to verify if the names include one of these words. If a single method matching the aforementioned condition is found, the converter at block 362 sets this method as a de-registration method and the other method as a registration method; otherwise, the converter enters block 364, wherein an operator is prompted to select which one of the called methods is the registration method and which one is the de-registration method.

In both cases, a statement implementing the interface "NotificationBroadcaster" is added to the MBean class at block 366; in this way, the methods "addNotificationListener", "removeNotificationListener" and "getNotificationInfo" are declared for the MBean class. The method then passes to block 366, wherein the method "getNotificationInfo" is defined and added to the MBean class as a dummy method (simply returning an empty object of the type "MBeanNotificationInfo").

Proceeding the block 370, the method "addNotificationListener" is defined and added to the MBean class so as to wrap the method of the non-MBean class identified as the registration one. The method "addNotificationListener" receives three arguments (of the type "NotificationListener", "NotificationFilter" and "Object", respectively) and then calls the registration method passing the first argument. The method "removeNotificationListener" is likewise defined and added to the MBean class at block 372, so as to wrap the method of the non-MBean class identified as the de-registration one. The method "removeNotificationListener" receives a single argument (of the type "NotificationListener") and then calls the de-registration method passing the received argument. The method continues to block 374, wherein the registration method and the de-registration method are dropped in the list of the retrieved methods; the method then passes to block 356.

For example, assume the non-MBean class has a method "myRegistration" and a method "myDeRegistration" that receive the argument "myListener" of the type "MyListener":
    public void myRegistration(MyListener myListener) {à};
    public void myDeRegistration(MyListener myListener)
        {à}
The methods "getNotificationInfo", "addNotificationListener" and "removeNotificationListener" (declared in the interface "NotificationBroadcaster") are added to the class "MyClassW" as follows:

```
public java.management.MBeanNotificationInfo[ ]
getNotificationInfo( )
    {return null;};
public void addNotificationListener
(NotificationListener listener
NotificationFilter filter
java.lang.Object handback)
    {MyObject.myRegistration(listener)};
public void removeNotificationListener
(NotificationListener listener)
    {MyObject.myDeRegistration(listener)}.
```

For each method still in the list of the retrieved methods, a loop is then performed starting at block 356 wherein a new method with the same name as a current method (from the first one) is declared in the MBean interface. The new method throws the same exceptions, receives the same arguments and returns the same results (if any) as the corresponding method of the non-MBean class. Proceeding to block 376, a test is made to determine whether the current method includes one or more statements calling an external method on different objects. If so, the current method is considered to define a relationship with the other objects; in this case, the converter enters block 378 wherein the new method is defined and added to the MBean class; the new method is created copying the source code of the current method. Whenever a statement calling an external method on another object is found, this statement is replaced with the invocation of the external method on the other object through the MBean server. The method then descends into block 380 (described in the following).

For example, if the non-MBean class has a method "callingMethod" that calls the method "externalMethod" on the object "OtherObject" passing an argument in the variable "callArgument" of the type "CallArgument" (without throwing any exception and returning any result):

```
public void callingMethod( )
    {OtherObject.externalMethod
    (callArgument)}
``` the method "callingMethod" is declared in the interface "MyClassWMBean":
  public void callingMethod ( ) { }
and the following method is added to the class "MyClassW" (assuming that the variable "MyServer" stores the name of the MBean server on which the MBean instantiating the class "MyClassW" is registered, and that the object "OtherObject" is the first instance of the class "OtherObjectClass"):

```
public void callingMethod( )
    {MyServer.invoke
    (ObjectName(":type=OtherObjectClass1"),
    externalMethod,
    callArgument,
    CallArgument)}
```

Conversely, if the current method does not include any statement calling a method on different objects (block 376) the current method is considered an operation of the MBean. In this case, the converter enters block 382 wherein the operation is defined and added to the MBean class so as to wrap the method of the non-MBean class; the operation receives the same arguments (if any) as the current method, calls the current method directly passing the received arguments, and returns the result of the current method (if any). The method then descends into block 380.

For example, if the non-MBean class has a method "myOperation" that receives an argument of the type "ArgumentType" in the variable "value", throws the exceptions "OperationExceptions" and returns a result of the type "ResultType":

```
public ResultType myOperation(ArgumentType value)
    throws OperationExceptions {à}
the method "myOperation" is declared in the interface "MyClassWMBean":
    public ResultType myOperation(ArgumentType value)
    throws OperationExceptions {à}
and the following method is added to the class "MyClassW":
    public ResultType myOperation(ArgumentType value)
    [throws OperationExceptions]
    {return MyObject.myOperation(value)}.
```

The converter then verifies at block 380 whether the last method of the list of the retrieved methods has been processed. If not, the method returns to block 356 to repeat the operations described above on a next iteration. Otherwise, the method ends at the final block 384.

The MBean can now be created (instantiating the MBean class) and registered with the MBean server. Whenever a management application calls a method exposed in the corresponding interface (through the MBean server), this method causes the MBean to carry out corresponding operations on the resource instrumented by the non-MBean. As a result, the MBean wraps the non-Bean allowing its management in the JMX architecture through the MBean.

Similar considerations apply if the converter performs an equivalent method, if different procedures are envisaged for analyzing the non-MBean so as to identify its exposed characteristics, if the characteristics of the MBean exploit the characteristics of the non-MBean in another way. For example, the converter supports read-only and/or write-only attributes, or the methods of the MBean are given names that are different from the ones of the corresponding methods of the non-MBean (such as with a pre-set suffix).

Alternatively, several concurrent processes that execute the above-described operations in parallel are envisaged. For example, a process analyses the constructors of the non-MBean class to generate the corresponding constructors of the MBean class, a further process analyses the public fields of the non-MBean class to generate the accessor methods for the corresponding attributes of the MBean class, and a still further process analyses the public methods of the non-MBean class to generate a listener or a broadcaster, to implement a relationship through the MBean server or to generate a corresponding operation of the MBean class.

More generally, the present invention proposes a method for managing objects non-compliant with a pre-set design pattern in a resource management framework supporting objects compliant with the design pattern. The method starts with the step of analyzing a non-compliant object to identify its exposed characteristics. Program code is generated for creating a compliant object, which takes a reference to the non-compliant object. Further program code is then generated for implementing the exposed characteristics of the compliant object exploiting corresponding exposed characteristics of the non-compliant object. In this way, the non-compliant object is made manageable in the resource management framework through the compliant object.

The method of the invention provides a solution for supporting objects that are non-compliant with the design pattern of the management framework. Therefore, even non-compliant objects may be managed allowing some sort of coexistence between compliant objects and non-compliant objects. This result is achieved substantially without requiring any knowledge of the resource management framework specification; the compliant objects can then be created with a simple automatic procedure. The solution of the invention makes it possible to preserve the investment in terms of human resources spent for writing the code and for testing the non-compliant objects. Moreover, the functions of the non-compliant objects may be made immediately available in the management framework, without any reliability concern. Therefore, even structures with a consolidated management framework may exploit the advantages of different architectures.

The solution of the invention provides a fast and direct access to the non-compliant objects, in order not to impair the throughput of the management framework.

Moreover, the compliant objects are generated off-line; therefore, the converter implementing the proposed solution is not required at run-time. In this way, the complexity of the management framework exploiting the non-compliant objects is strongly reduced.

The devised structure supports relationships between the non-compliant objects. Particularly, the method of the invention allows the use of notifications among the non-compliant objects.

The preferred embodiment of the invention described above offers further advantages. For example, the proposed solution is specifically designed for allowing non-MBeans to be managed in the JMX architecture (even if applications in different management frameworks are contemplated and within the scope of the present invention).

Advantageously, for each constructor of the non-MBean class a corresponding constructor is defined for the MBean class (calling the one of the non-MBean class). This feature makes it possible to get access to the non-MBean at the same time when the MBean is instantiated.

Preferably, a getter method is declared for each public field of the non-MBean class; the getter method is defined to return the field directly. In this way, any public field of the non-MBean may be read as an attribute of the JMX specification. Moreover, a setter method is likewise declared and defined for each public field of the non-MBean class. As a consequence, any public field of the non-MBean may be written as an attribute of the JMX specification as well.

In a preferred embodiment of the invention, if the non-MBean qualifies as a listener the MBean class is made to implement the corresponding interface; a method for handling the notifications is then defined in the MBean class calling a corresponding method identified in the non-MBean class. This feature makes it possible to manage notifications complying with the JMX specification by the non-MBean.

Moreover, if the non-MBean qualifies as a broadcaster the MBean class is made to implement the corresponding interface; a method for adding listeners and a method for removing listeners are then defined in the MBean class calling corresponding methods identified in the non-MBean class. In this way, the non-MBean may also emit notifications according to the JMX specification.

As a further improvement, the registration method and the de-registration method are distinguished according to their names.

Preferably, a new method is declared in the MBean class for each public method of the non-MBean class. If the (original) method calls methods on different objects, the new method is defined using the program code of the original method and replacing any call with the invocation of the called method on the MBean server; otherwise, the new method simply calls the original one.

In this way, any public method of the non-MBean may be used in an operation; moreover, the proposed solution provides a simple support for relationships between the non-MBeans.

However, the solution according to the present invention leads itself to be implemented with other constructors for the MBean, defining the accessor methods for the attributes in a different manner, managing the non-MBeans qualifying as listener or as broadcaster in another way, or providing a different support for the relationships.

For example, in a different embodiment of the invention the converter verifies (for each attribute) whether a method is defined for reading the attribute in the non-Bean class; if so, the corresponding getter method is defined wrapping the reading method, so as to return its result (conversely, the getter method returns the attribute directly). The converter likewise verifies whether a method is defined for writing the attribute; if so, the corresponding setter method is defined wrapping the writing method, so as to pass the received argument (conversely, the setter method assigns the attribute directly). This solution exploits the methods already defined in the non-MBean; however, it may require changes in other objects calling the reading and/or writing methods of the non-MBean.

Alternatively, read only and/or write only attributes are supported (irrespective of their type), the arguments of the signaling method, the registering method and the de-registering method of the non-MBean must comply with the type signature defined in the JMX specification, the registration method and the de-registration method are distinguished parsing their code. Moreover, the proposed solution is also suitable to be implemented with a restrained support (or even with no support at all) for notifications and/or relationships.

Advantageously, the solution according to the present invention is implemented with a computer program, which is provided on CD-ROM. Typically, the method of the invention is implemented in an object-oriented infrastructure.

Alternatively, the program is provided on floppy disk, is pre-loaded onto the hard-disk, or is stored on any other computer readable medium, is sent to the computer through a network (typically the Internet), is broadcast, or more generally is provided in any other form directly loadable into a working memory of the computer. However, the method according to the present invention leads itself to be carried out with a different infrastructure, or even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

What is claimed is:

1. A method for managing objects non-compliant with a pre-set design pattern in a resource management framework supporting Managed Bean ("MBean") objects compliant with the design pattern, the method including the steps of:

machine analyzing, by way of a processor and a memory, a particular non-MBean to identify public characteristics thereof, the non-MBean instantiating a non-MBean class having public fields and methods;

machine generating, by way of the processor and the memory, an uncompiled source code class prior to run-time execution of a resource management framework comprising a compiled version of the uncompiled source code class, the uncompiled source code class creating a standard MBean referencing the non-MBean, the uncompiled source code class implementing an interface exposed to an MBean server, the interface having a name derived from a name of the MBean class according to a pre-set design pattern; and machine generating, by way of the processor and the memory, uncompiled source code in the uncompiled source code class prior to the run-time execution, the uncompiled source code implementing public characteristics of the MBean that call corresponding public characteristics of the non-MBean such that the uncompiled source code class defines an MBean class customized to characteristics of the non-MBean, wherein the non MBean is accessible in the resource management framework through the MBean during the run-time execution.

2. The method according to claim 1, further including the steps of:

retrieving at least one constructor for instantiating the non-MBean; and defining at least one further constructor for instantiating the MBean, each further constructor calling a corresponding constructor.

3. The method according to claim 1, wherein the method further includes for each field the steps of:
  declaring a getter method in the interface, the getter method having a name derived from a name of the field according to the design pattern; and
  defining the getter method in the MBean class to return the field.

4. The method according to claim 1, further including for each field of a non-Boolean type the steps of:
  declaring a setter method in the interface, the setter method having a name derived from a name of the field according to the design pattern and receiving an argument corresponding to the field; and
  defining the setter method in the MBean class to assign the argument to the field.

5. The method according to claim 1, further including the steps of:
  verifying whether the non-MBean class has a signaling method called by a different object, the different object having two methods called by the non-MBean and passing the non-MBean as an argument;
  defining the MBean class as a listener of notifications according to the design pattern, thereby declaring a notification handling method having a pre-set name established by the design pattern; and
  defining the notification handling method in the MBean class to call the signaling method.

6. The method according to claim 1, further including the steps of:
  verifying whether the non-MBean class has a registration method and a de-registration method called by at least one further different object passing the at least one further different object as an argument, the at least one further different object having a method called by the non-MBean;
  defining the MBean class as a broadcaster of notifications according to the design pattern, thereby declaring an add listener method and a remove listener method having pre-set names established by the design pattern; and
  defining the add listener method and the remove listener method in the MBean class to call the registration method and the de-registration method, respectively.

7. The method according to claim 6, wherein the step of verifying whether the non-MBean class has a registration method and a de-registration method includes:
  identifying two eligible methods in the non-MBean class called by the at least one further different object passing the at least one further different object as an argument;
  verifying whether a matching one of the two eligible methods has a name indicative of a de-registration operation; and
  setting the matching eligible method as the de-registration method and the other one of the two eligible methods as the registration method.

8. The method according to claim 1, further including for each method the steps of:
  declaring a corresponding further method in the interface;
  verifying whether the source code of the method includes at least one relationship statement calling an external method on a still further different object; and
  defining the further method in the MBean class copying the source code of the method with each relationship statement replaced with an invocation of the external method on the still further different object through the MBean server if the verification is positive, or defining the further method in the MBean class to call the method and to return a result of the method if the verification is negative.

9. A computer program directly loadable into a working memory of a computer for performing a method of managing objects non-compliant with a pre-set design pattern in a resource management framework supporting Managed Bean ("MBean") objects compliant with the design pattern when the program is run on the computer, the method including the steps of:
  machine analyzing, by way of a processor and a memory, a particular non-MBean to identify public characteristics thereof, the non-MBean instantiating a non-MBean class having public fields and methods;
  machine generating, by way of the processor and the memory, an uncompiled source code class prior to run-time execution of a resource management framework comprising a compiled version of the uncompiled source code class, the uncompiled source code class creating a standard MBean referencing the non-MBean, the uncompiled source code class implementing an interface exposed to an MBean server, the interface having a name derived from a name of the MBean class according to a pre-set design pattern; and
  machine generating, by way of the processor and the memory, uncompiled source code in the uncompiled source code class prior to the run-time execution, the uncompiled source code implementing public characteristics of the MBean that call corresponding public characteristics of the non-MBean such that the uncompiled source code class defines an MBean class customized to characteristics of the non-MBean, wherein the non-MBean is accessible in the resource management framework through the MBean during the run-time execution.

10. A program product comprising a computer readable medium on which a computer program is stored, the computer program being directly loadable into a working memory of a computer for performing a method of managing objects non-compliant with a pre-set design pattern in a resource management framework supporting Managed Bean ("MBean") objects compliant with the design pattern when the program is run on the computer, the method including the steps of:
  machine analyzing, by way of a processor and a memory, a particular non-MBean to identify public characteristics thereof, the non-MBean instantiating a non-MBean class having public fields and methods;
  machine generating, by way of the processor and the memory, an uncompiled source code class prior to run-time execution of a resource management framework comprising a compiled version of the uncompiled source code class, the uncompiled source code class creating a standard MBean referencing the non MBean, the uncompiled source code class implementing an interface exposed to an MBean server, the interface having a name derived from a name of the MBean class according to a pre-set design pattern; and
  machine generating, by way of the processor and the memory, uncompiled source code in the uncompiled source code class prior to the run-time execution, the uncompiled source code implementing public characteristics of the MBean that call corresponding public characteristics of the non-MBean such that the uncompiled source code class defines an MBean class customized to characteristics of the non-MBean, wherein the non MBean is accessible in the resource management framework through the MBean during the run-time execution.

11. An object-oriented infrastructure for implementing a method of managing objects non-compliant with a pre-set design pattern in a resource management framework supporting Managed Bean ("MBean") objects compliant with the design pattern, the method including the steps of:

machine analyzing, by way of a processor and a memory, a particular non-MBean to identify public characteristics thereof, the non-MBean instantiating a non-MBean class having public fields and methods;

machine generating, by way of the processor and the memory, an uncompiled source code class prior to run-time execution of a resource management framework comprising a compiled version of the uncompiled source code class, the uncompiled source code class creating a standard MBean referencing the non-MBean, the uncompiled source code class implementing an interface exposed to an MBean server, the interface having a name derived from a name of the MBean class according to a pre-set design pattern; and machine generating, by way of the processor and the memory, uncompiled source code in the uncompiled source code class prior to the run-time execution, the uncompiled source code implementing public characteristics of the MBean that call corresponding public characteristics of the non-MBean such that the uncompiled source code class defines an MBean class customized to characteristics of the non-MBean, wherein the non-MBean is accessible in the resource management framework through the MBean during the run-time execution.

12. A system for managing objects non-compliant with a pre-set design pattern in a resource management framework supporting Managed Bean ("MBean") objects compliant with the design pattern, the system including means for machine analyzing, by way of a processor and a memory, a particular non-MBean to identify public characteristics thereof, the non-MBean instantiating a non-MBean class having public fields and methods;

means for machine generating, by way of the processor and the memory, an uncompiled source code class prior to run-time execution of a resource management framework comprising a compiled version of the uncompiled source code class, the uncompiled source code class creating a standard MBean referencing the non-MBean, the uncompiled source code class implementing an interface exposed to an MBean server, the interface having a name derived from a name of the MBean class according to a pre-set design pattern; and means for machine generating, by way of the processor and the memory, uncompiled source code in the uncompiled source code class prior to the run-time execution, the uncompiled source code implementing public characteristics of the MBean that call corresponding public characteristics of the non-MBean such that the uncompiled source code class defines an MBean class customized to characteristics of the non-MBean, wherein the non MBean is accessible in the resource management framework through the MBean during the run-time execution.

13. A system for managing objects non-compliant with a pre-set design pattern in a resource management framework supporting Managed Bean ("MBean") objects compliant with the design pattern, the system including a software module for machine analyzing, by way of a processor and a memory, a particular non-MBean to identify public characteristics thereof, the non-MBean instantiating a non-MBean class having public fields and methods;

a software module for machine generating, by way of the processor and the memory, an uncompiled source code class prior to run-time execution of a resource management framework comprising a compiled version of the uncompiled source code class, the uncompiled source code class creating a standard MBean referencing the non-MBean, the uncompiled source code class implementing an interface exposed to an MBean server, the interface having a name derived from a name of the MBean class according to a pre-set design pattern; and a software module for machine generating, by way of the processor and the memory, uncompiled source code in the uncompiled source code class prior to the run-time execution, the uncompiled source code implementing public characteristics of the MBean that call corresponding public characteristics of the non-MBean such that the uncompiled source code class defines an MBean class customized to characteristics of the non-MBean, wherein the non MBean is accessible in the resource management framework through the MBean during the run-time execution.

\* \* \* \* \*